P. R. GLASS.
HEEL SEAT NAILING MACHINE.
APPLICATION FILED DEC. 22, 1913.

1,246,906.

Patented Nov. 20, 1917.
14 SHEETS—SHEET 6.

P. R. GLASS.
HEEL SEAT NAILING MACHINE.
APPLICATION FILED DEC. 22, 1913.

1,246,906.

Patented Nov. 20, 1917.
14 SHEETS—SHEET 7.

WITNESSES:

INVENTOR:

P. R. GLASS.
HEEL SEAT NAILING MACHINE.
APPLICATION FILED DEC. 22, 1913.
1,246,906.
Patented Nov. 20, 1917.
14 SHEETS—SHEET 10.
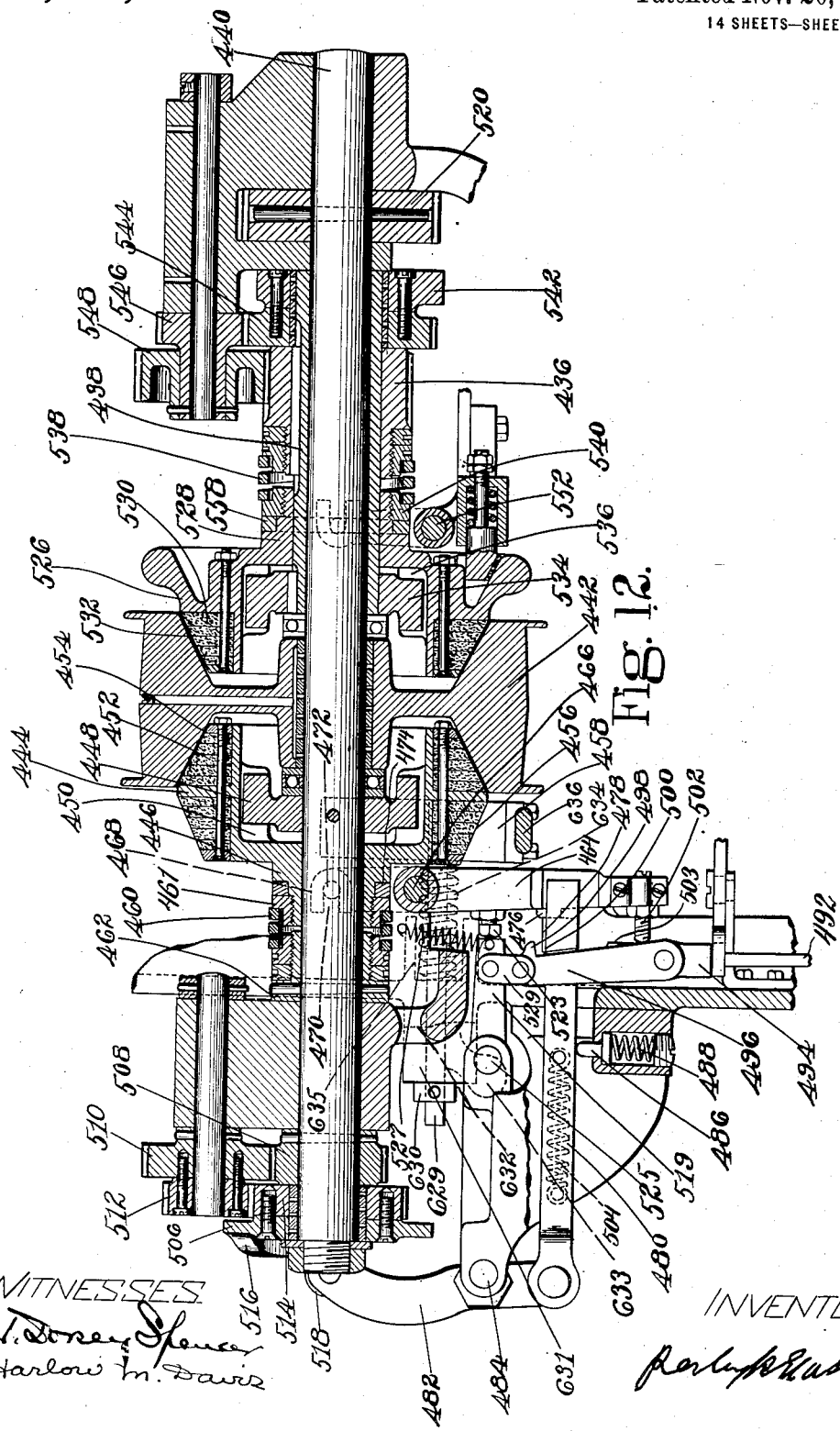

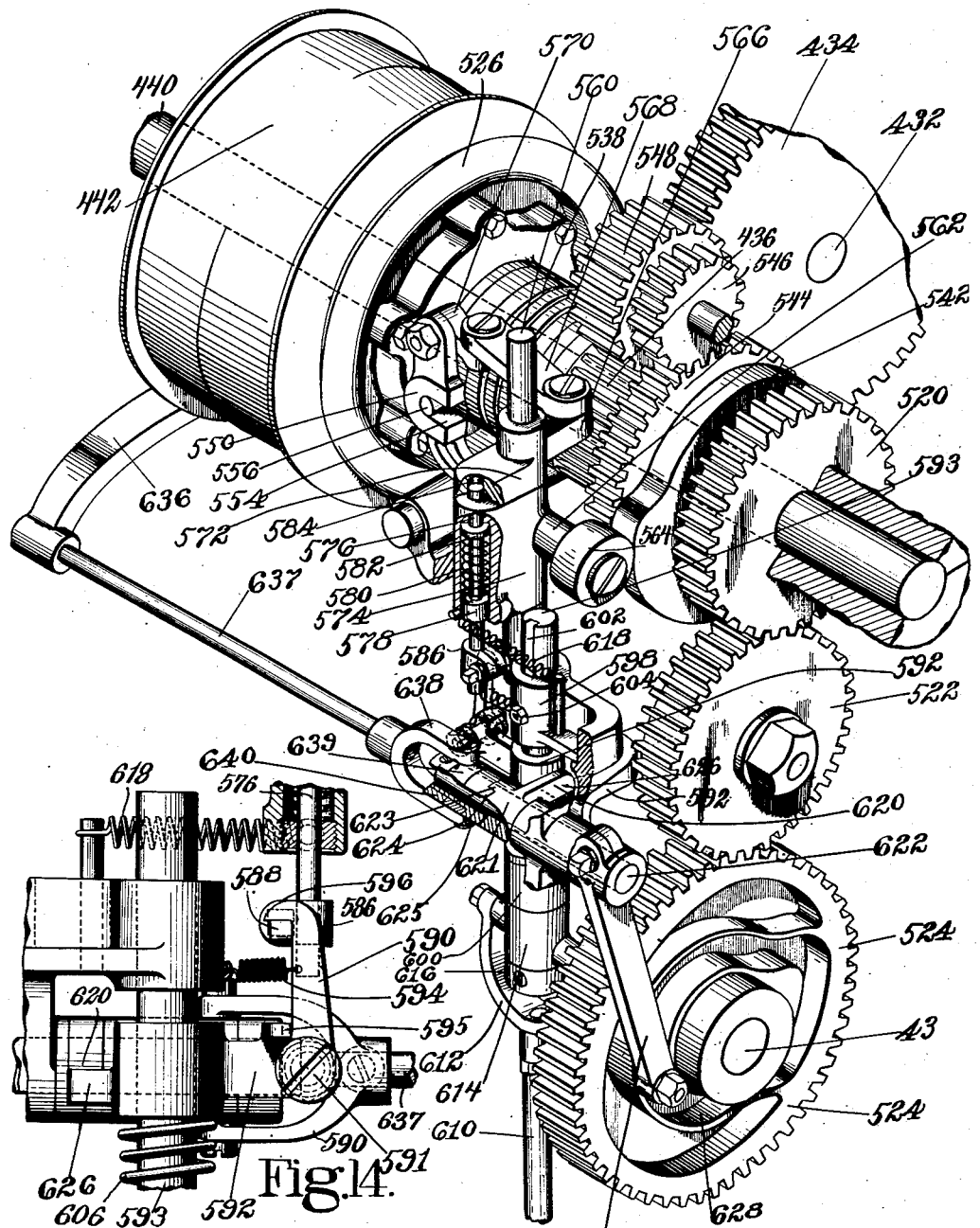

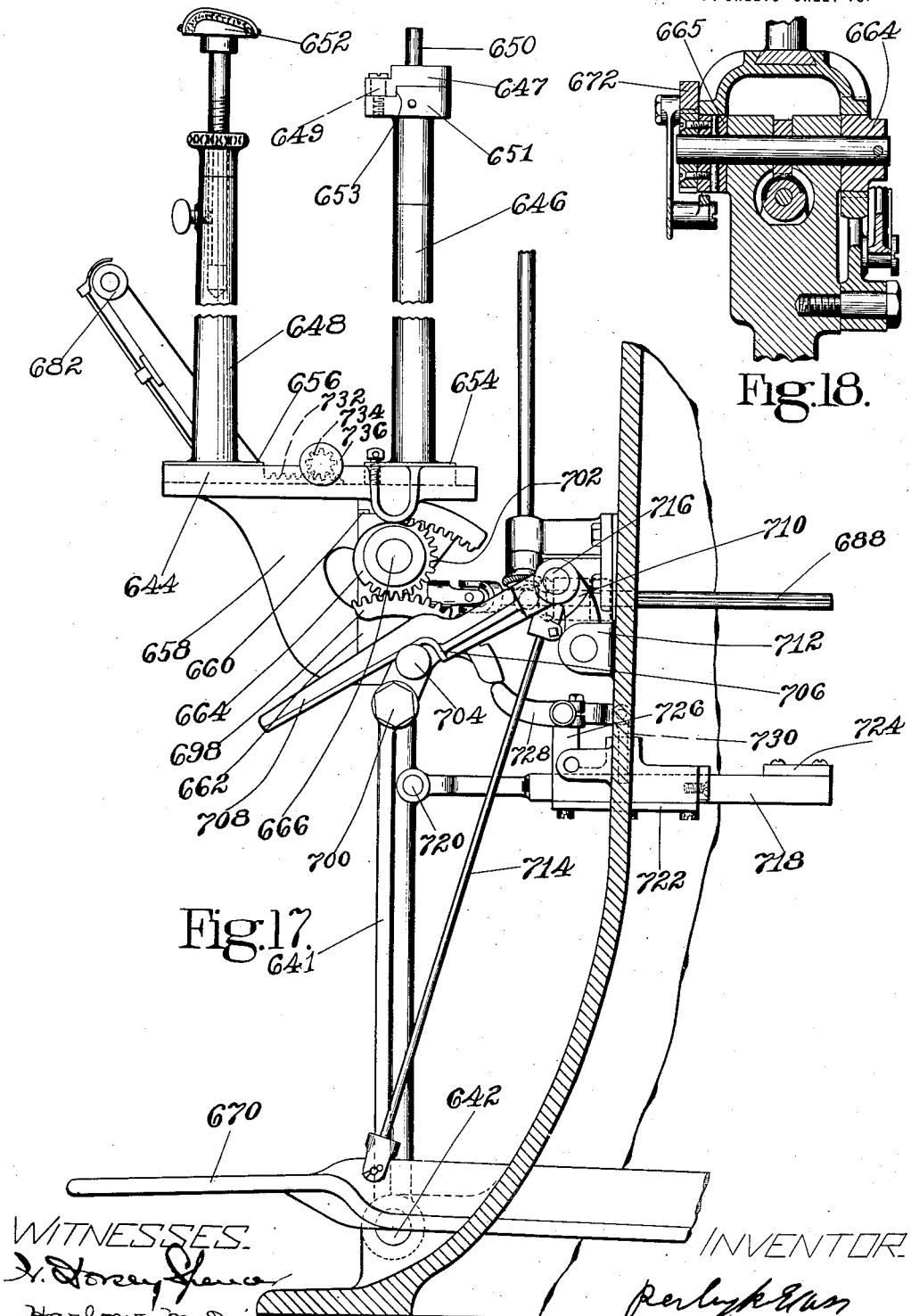

UNITED STATES PATENT OFFICE.

PERLEY R. GLASS, OF BROOKLINE, MASSACHUSETTS, ASSIGNOR TO UNITED SHOE MACHINERY COMPANY, OF PATERSON, NEW JERSEY, A CORPORATION OF NEW JERSEY.

HEEL-SEAT-NAILING MACHINE.

1,246,906.  Specification of Letters Patent.  Patented Nov. 20, 1917.

Application filed December 22, 1913. Serial No. 808,183.

*To all whom it may concern:*

Be it known that I, PERLEY R. GLASS, a citizen of the United States, residing at Brookline, in the county of Norfolk and State of Massachusetts, have invented certain Improvements in Heel-Seat-Nailing Machines, of which the following description, in connection with the accompanying drawings, is a specification, like reference characters on the drawings indicating like parts in the several figures.

This invention relates to machines for inserting fastenings and is herein shown as embodied in a fastening inserting machine which inserts at a single operation all of the fastenings to be inserted in a single piece of work.

In the manufacture of boots and shoes, in which art the invention is especially useful, machines of the general type above referred to have been employed for the most part for attaching heels, such work presenting comparatively uniform conditions and being of such a nature that it could scarcely be performed satisfactorily by a machine which operated to insert the fastenings successively. The other fastening inserting operations upon boots and shoes have been performed almost exclusively, up to the present time, by machines which insert the fastenings successively, such machines being adapted to meet better the varying conditions of the work and to operate upon a greater number of shoes in a given time than the multiple fastening inserting machines or gang nailers hitherto known.

Besides the heel attaching operation, however, there is performed in the manufacture of the ordinary types of boots and shoes another fastening inserting operation which presents substantially the same conditions so far as uniformity of numbers and locations of the nails is concerned as the heel attaching operation. This operation is the attachment of the heel-seat. For this operation there would be many advantages in employing a machine which would insert at one time all of the fastenings required, provided the machine could perform as much work as machines for successively inserting fastenings for this purpose.

An object of the present invention, therefore, is to provide an improved machine of the type above referred to which shall have especial utility for attaching the heel-seat ends of outsoles to the insoles and uppers, which shall have capacity for a quantity of work that will greatly exceed that performed by machines of other types, and which shall produce work of a quality superior to that produced by machines of other types.

Other objects of the invention are to provide a machine of this type which will operate upon a wide range of sizes of boots or shoes, and which will preferably not only attach the heel-seat but also perform other operations thereon, to provide improved mechanism for delivering automatically to the inserting mechanism a predetermined plurality of fastenings, to provide convenient and easily operated means for adjusting the machine to cause it to operate upon different ranges of sizes, by which a quick adjustment from one size range to another may be effected, and to provide a machine of this type in which the proper sequence of operations is positively insured, whereby danger of breakage of the machine and damage to the work is avoided.

Still other objects and features of the invention will appear from the following description and claims when considered in connection with the accompanying drawings, in which—

Fig. 12 is a longitudinal section along the main driving shaft showing the construction of the clutches and of the actuating mechanism;

Fig. 13 is an enlarged detail perspective showing the actuating mechanism for the sole laying mechanism and the connection between this mechanism and the nailing mechanism;

Fig. 14 is a detail elevation of a part of the mechanism shown in Fig. 13;

Fig. 17 is a side elevation of one of the jack constructions;

Fig. 18 is a detail section along the line 6—6 of Fig. 17;

Figure 1:
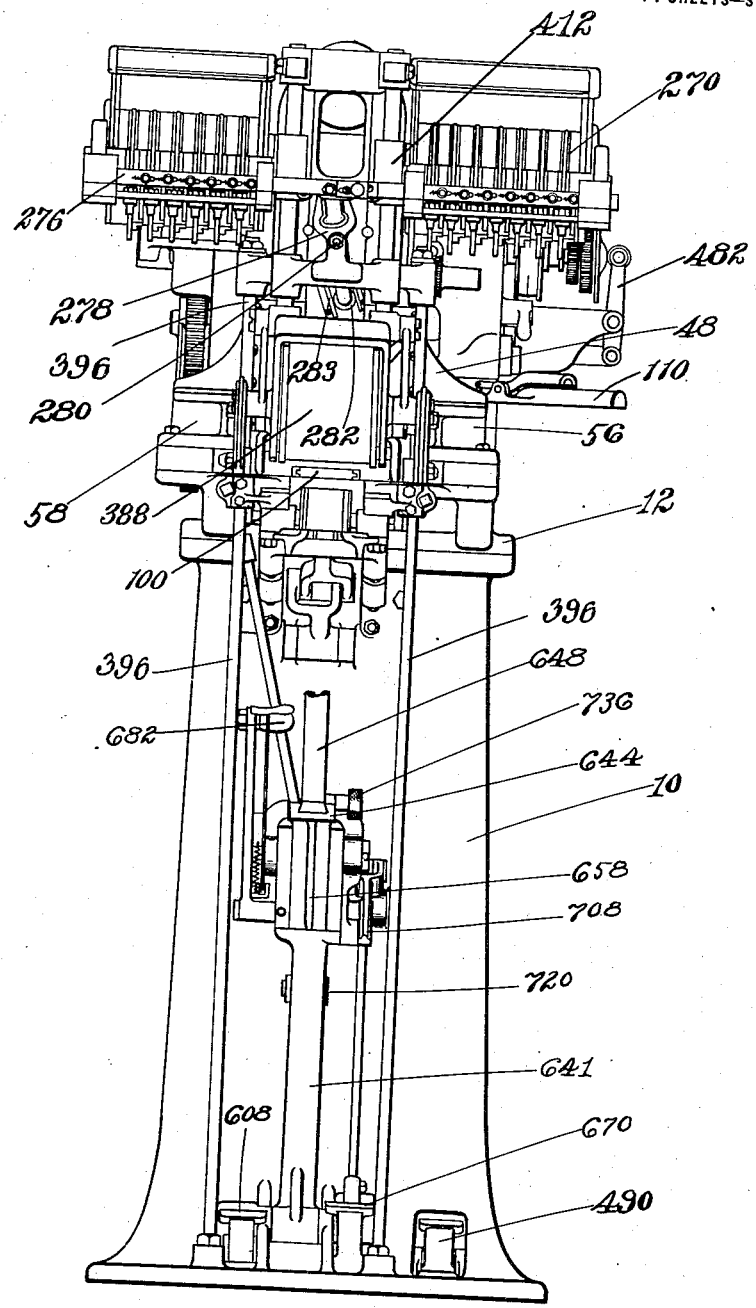
Figure 1 is a front elevation of a machine embodying the invention; the flexible nail conducting tubes being removed.

The frame of the machine comprises a standard 10 and a head 12, the principal operative parts of the machine being mounted in the head. The machine is intended especially for nailing heel-seats, that is, for attaching the heel-seat end of the outsole to the insole and upper, and in order that the machine may operate effectively upon shoes of a wide range of sizes provision is made for quick and easy adjustment of various parts whereby the machine may be adapted for nailing different successive ranges of sizes, the illustrated machine having capacity for dealing with sizes from 5 to 12 in three successive ranges of five sizes each, each of the half sizes being counted as a size.

The nails which attach the heel-seat are preferably driven simultaneously without changing the position of the work and therefore three gangs of nail drivers are provided in the illustrated machine, each gang being intended for use with five different sizes of shoes. These gangs of drivers, each composed of a number of drivers corresponding to the number of nails which it is desired to insert in the heel-seat to secure it firmly in position, are carried respectively by three driver plates or blocks 20, 22 and 24 which have formed in their upper faces alined dove-tailed grooves 26 arranged to receive in succession the dove-tailed lower end of the driver operating plunger 28. The plunger 28 is provided with a rack 30 which is preferably located near a line passing through the center of the gang of drivers. The rack 30 meshes with a segment gear 32 upon a short shaft 34. Extending rearwardly from the hub of the gear 32 is an arm 36 to which is pivotally connected an adjustable link 38 carrying a cam roll 40 which enters a cam groove in a cam disk 42 upon a shaft 43. The link 38 is supported and guided in its movements by a second link 44 pivoted at 45 upon the machine frame.

The driver operating plunger 28 reciprocates in a vertically movable awl operating head or casing 46, the upper part of the plunger being shaped to fit the interior of the casing 46 and the lower end being somewhat smaller in one of its transverse dimensions so that it may enter one of the guides in a driver guide slide 48 arranged to slide through the casing 46 to bring its three guides and the driver blocks 20, 22 and 24, carried in said respective guides, into operative relation to the plunger 28. The slide 48 moves in stationary ways formed in brackets 56 and 58 upon opposite sides of the casing 46. Spring-pressed plungers 59 carried by the driver blocks enter sockets in the front wall of the slide 48 and hold the blocks yieldingly in their elevated positions, with the grooves 26 in alinement. The awls 60, of which there are three gangs, corresponding in numbers and arrangement to the three gangs of drivers, are carried in dove-tailed plates 66, 68 and 70 which slide in arc-shaped ways 71 formed in a casing 72 carried by the machine frame. The ways 71 are interrupted at a point substantially midway of their length to receive an awl-carrying slide 74 which travels in transverse guideways 76 arranged above the arc-shaped ways 71, the slide 74 having formed in that portion which extends into the path of travel of the plates 66, 68 and 70 a continuation of the ways 71 and being so dimensioned that it can sustain an awl-carrying plate and transfer the plate from its position in the ways 71 into position in the lower part of the awl-operating head or casing 46, the guideways 76 being extended into said casing.

Automatic means is provided for moving the slide 74 to cause it to bring the selected awl-carrying plate with its awls into operative position in the lower part of the head 46. The illustrated means comprises a pusher bar 78 which is slotted to embrace and clear a vertical rock-shaft 112, hereinafter specifically described, this bar being arranged to slide in the machine frame and having formed on its front end a vertically extended dove-tailed guideway 80 which receives a dove-tail upon the rear end of the slide 74 to provide for the vertical movement of the slide 74 and the awls with respect to the pusher bar 78 during the awl driving movement of the slide 46. Pivotally connected to the rear end of the pusher bar 78 is a link 82 which is itself pivotally connected to a second link 84 pivoted at its opposite end upon the machine frame and carrying a cam roll 86 which enters a cam groove in the cam disk 88 upon the shaft 43.

The nails to be driven are delivered to suitable openings in a nail block 100 through which they pass into contact with the surface of the work and into which the drivers enter to drive the nails into the work. The nail block is provided with three sets of nail receiving openings which correspond in numbers and arrangement with the numbers and arrangement of the sets of drivers and awls which are to enter the openings. Although the nail block herein shown is formed in a single piece, it will be understood that the formation of the nail block in a single piece is not essential and that each of the three sets of nail receiving openings may be formed in separate blocks either connected together to move together or so arranged that one of the blocks will engage and push another as it is moved. In order that the openings suited to the particular gang of drivers or awls which is to operate may be brought into position beneath the plunger 28, the nail block 100 is constructed and arranged to slide in ways in the machine frame to bring the different sets of openings successively into position beneath the said plunger. To this end the block 100 is provided with lateral ribs 108 which enter grooves formed in the machine frame or in plates 109 attached to the machine frame, see Fig. 5. The shoe to be operated upon will be pressed up against the under side of the block 100 and on its under side beneath each set of nail receiving openings the block will preferably be shaped so that it will conform approximately to the shape of the heel-seat end of the shoe pressed against it. Preferably the block will be provided upon its under side with a pad formed of some soft material such as leather or wood, or some soft metal, which will serve as a block against which the heel-seat trimming mechanism hereinafter to be described may operate.

Figure 6:
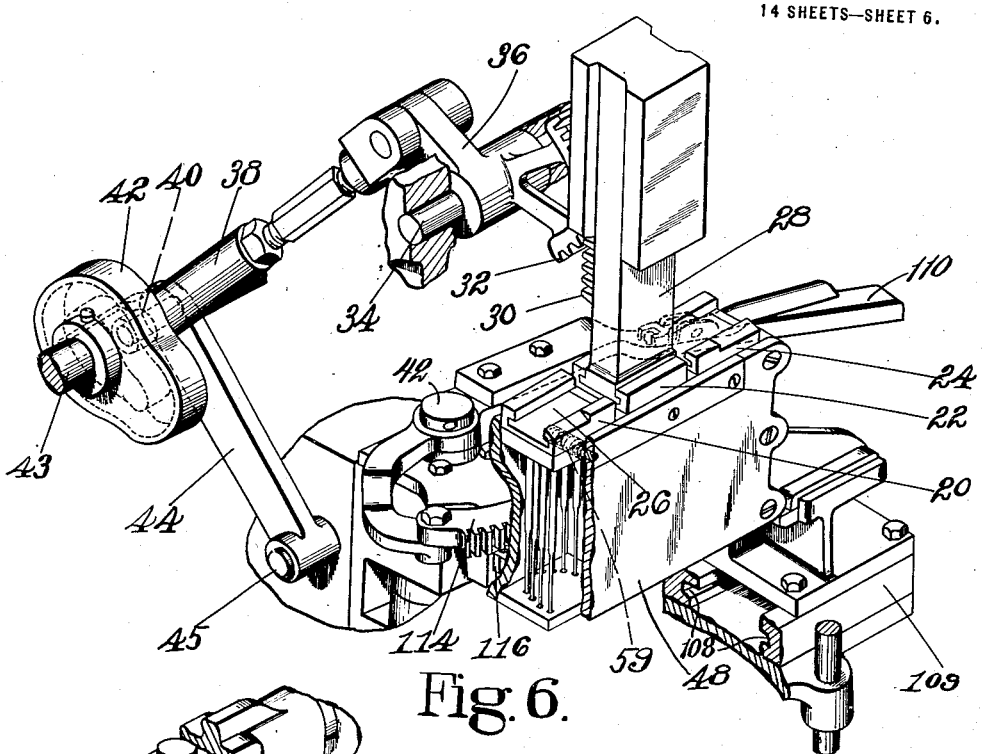
Fig. 6 is a detail perspective of the driver operating mechanism and of the means for effecting the movement into operative position of the different sets of drivers.
Figure 7:
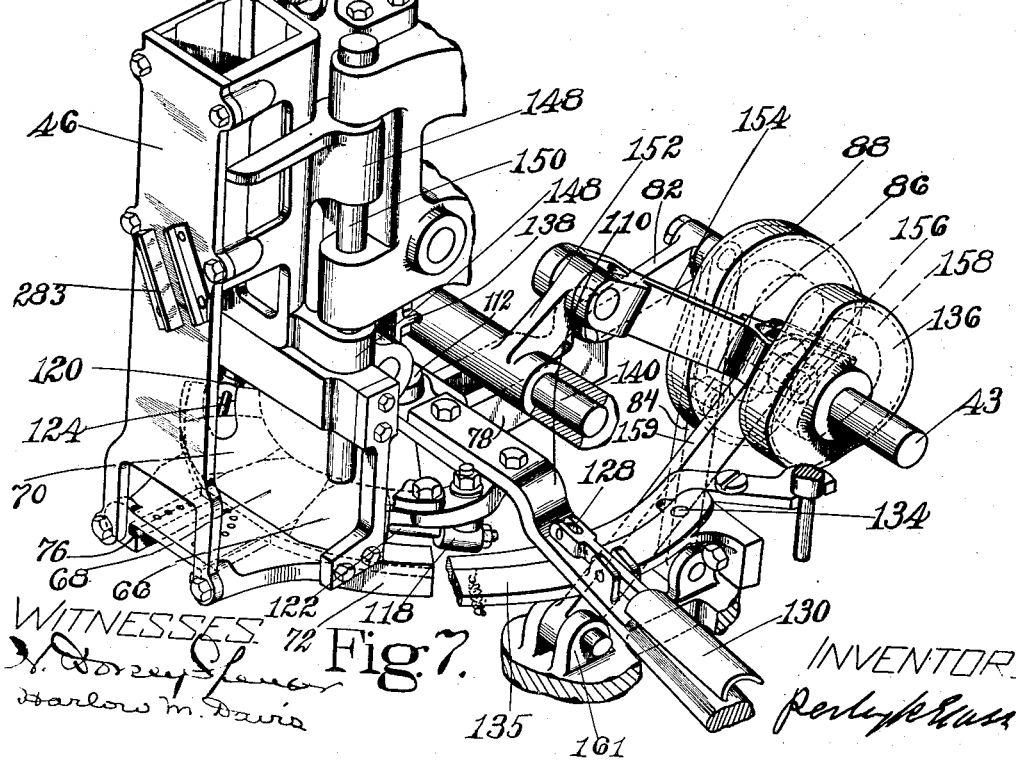
Fig. 7 is a detail perspective of the awl operating mechanism and the means for effecting a movement into operative position of the different sets of awls.

Preferably a single means will be provided for moving the nail block, the awls and drivers into their proper operative relations to each other. The illustrated means comprises a lever 110 attached to the vertical rock-shaft 112, see Fig. 6. The lever 110 carries a segment rack 114 which meshes with a straight rack 116 upon the back side of the driver guide slide 48. Turning of the lever with the rock-shaft 112 will therefore cause the slide 48 to move across the front of the machine to bring the driver blocks 20, 22 and 24 successively into operative relation to the plunger 28.

Bolted to the under side of the lever 110 are holders 118 and 120 in which are adjustably confined pushers 122, 124 for the awl carrying plates, the pusher 122 engaging the awl plate 66 and the pusher 124 engaging the awl plate 70. The middle plate 68 is engaged by one or the other of the plates 66 and 70.

A second segment rack 126 mounted upon arms 127 rigidly connected to the rock-shaft 112 engages a straight rack 113 formed upon the rear face of the nail block 100 and moves said nail block across the front of the machine simultaneously with the movement of the driver guide slide 48. It will thus be seen that the turning of the lever 110 to effect the movement of the slide 48 causes the simultaneous movement of the awl plates 66, 68 and 70 and the nail block 100 and therefore brings the proper set of openings in the nail block into position beneath the gang of drivers intended to enter the openings, and brings that one of the plates 66, 68 and 70 which carries the appropriate set of awls into such position in the slide 74 that on the next forward movement of the pusher bar 78 the awls will be brought into operative position in the lower part of the head 46. The lever 110 is locked in its different positions of adjustment by means of a plunger 128 upon one end of a latch member 130 pivoted upon the handle of the said lever, the plunger being maintained yieldingly in its lowermost position by a suitable spring arranged between the handle part of the latch member and the handle part of the lever.

The plunger 128 is arranged to enter openings 134 in an arc-shaped plate 135 extending along the path of movement of the lever 110, there being one opening for each of the gangs of awls and drivers so located that the lever 110 will be locked when the awls, drivers and nail block are in their proper positions of adjustment. The movement of the head or casing 46 to force the awls into the work is effected by operative connections with a cam disk 136 upon the shaft 43, these connections comprising a forked arm 138 of a lever fulcrumed upon a shaft 140 confined in the machine frame. The forked arm 138 receives between its members a block 144 pivoted between ears 146 extending rearwardly from the casing or head 46, these ears being formed upon the lower pair of guiding extensions 148 of the casing 46, which slide upon vertical guide rods 150. The other arm 152 of this lever is pivotally connected to a link 154 which carries a cam roll 156 which enters a cam groove 158 in the cam disk 136. The link 154 is guided in its lever operating movements by a second link 159 pivoted at one end between ears 161 upon the machine frame and at its other end between the two parts of the forked rearward end of the link 154.

Figure 8:
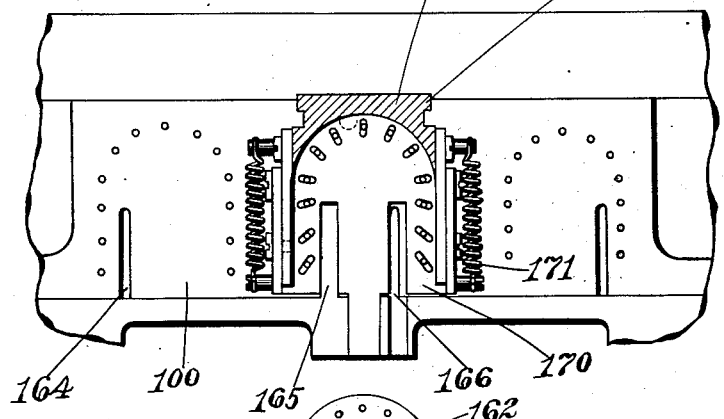
Fig. 8 is a detail plan, partly in section, showing the nail loader carrier and the means for insuring the use of the proper nail loader for each adjustment of the machine.

The nails are delivered to the openings in the nail block 100 by a nail loader 162, there being one of these nail loaders for each of the three size ranges so that the openings in the nail loader will register properly with the openings in the nail block. As shown particularly in Fig. 8, the nail loader 162 for the particular size range which is to be operated upon is adapted to be slipped into the nail loader carrier 163 when the nail block has been adjusted to bring the set of nail receiving openings for that size range into proper position beneath the nail loader carrier 163. To prevent the insertion of a nail loader for a different size range the nail block 100 is provided with grooves 164 so located with respect to two slots 165 and 166 that the groove for any particular size range registers with one or the other of the said slots 165, 166 when the nail block has been adjusted into proper nail receiving position and the groove for a particular size range will receive a pin 167 upon the nail loader for that size range but is so located that the pin 167 for the nail loader of another size range will be offset with respect to said groove so that said nail loader cannot be inserted in the nail loader carrier.

The nail loader carrier 163 is provided with ribs 168 which enter grooves 169 in the front end of the awl carrying slide 74, this rib and groove connection permitting the awl carrier to move up and down without disturbing the connection between the awl carrier and the nail loader. The nail loader is thus moved between nail receiving position and nail delivering position by the movement of the awl carrying slide 74 to carry the awls into and out of operative position below the lower part of the casing 46. The nails are retained in the loader 162 until the loader comes into delivering position by a retaining plate 170, yieldingly held in its retaining position by springs 171.

Figure 5:
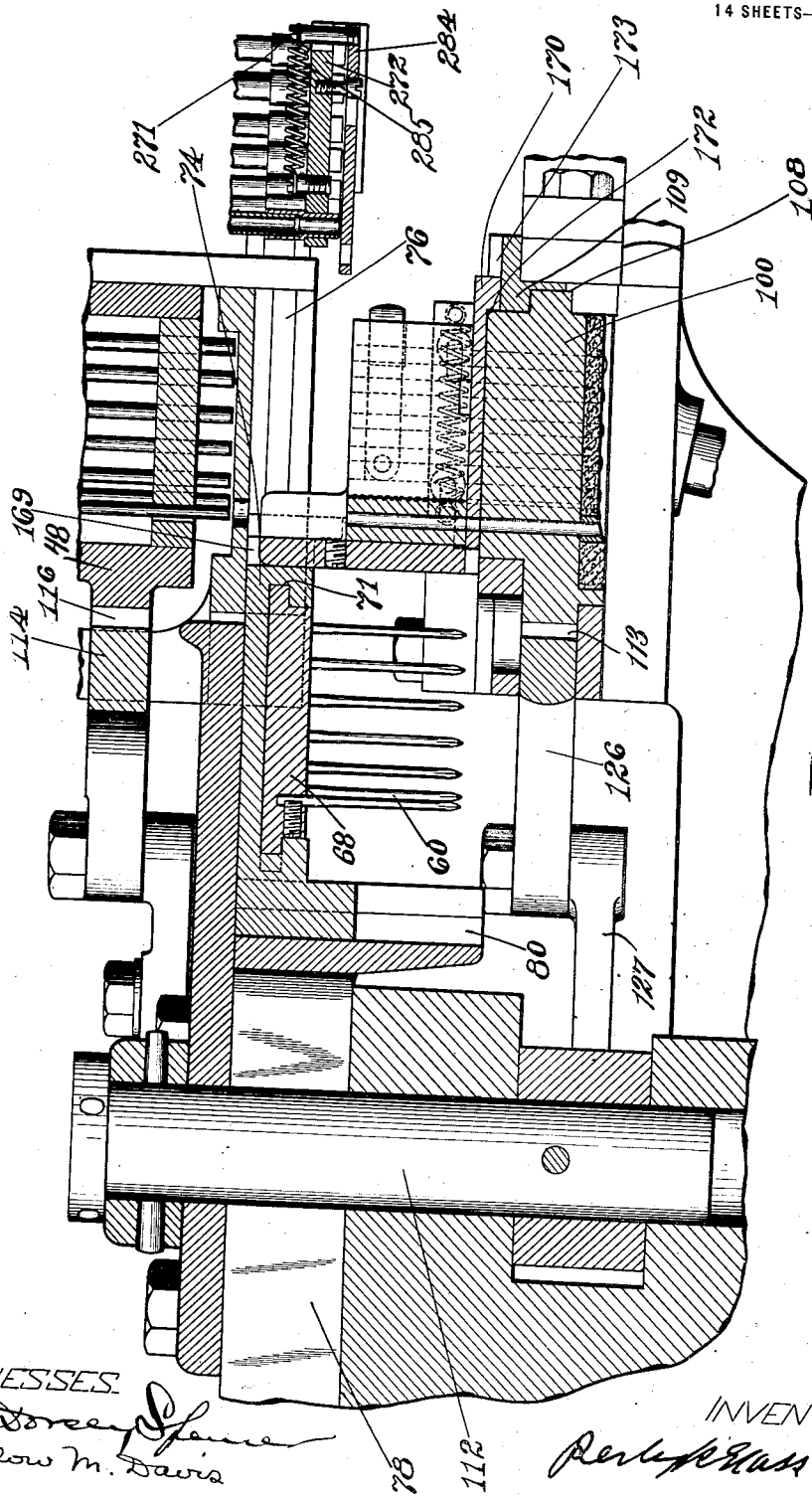
Fig. 5 is a detail sectional view illustrating the means for effecting and the provisions for the various relative movements of the awls, drivers and nail loader.

In Fig. 5 the retaining plate 170 is shown in the position in which its openings register with the openings in the nail loader 162, being brought into this position as the nail loader 162 is retracted into nail delivering position by the engagement of a shoulder 172 upon said plate with the front edge of the nail block 100, the lug upon the plate 170 upon which this shoulder 172 is formed traveling in a groove 173 in the upper face of one of the nail block guides.

The means for supplying nails to the nail loader, when it is in fastening receiving position, comprises a plurality of flexible nail tubes 268, one for each nail opening in the nail loader, these tubes serving to guide the nails from a corresponding plurality of raceways 270 into short fixed tubes 271 inserted in openings in a plate 272 arranged to register with the corresponding openings in the nail loader when the nail loader is in nail receiving position. Coöperating with each of the raceways is a separator 274 having a yielding connection with a common separator bar 276, through which all of the separators are operated simultaneously to deliver nails to the tubes 268. The means for operating the separator bar comprises a lever 278 fulcrumed at 280 upon a bracket carried by the machine frame, this lever being forked at its upper end and receiving between the members of said forked end a block 281 pivoted upon the separator bar 276.

The lower end of the lever 278 carries a cam roll 282 which travels in an inclined cam groove formed by plates 283 attached to the front face of the awl operating head or casing 46. The separators are thus operated to separate a nail from each of the raceways as the awl operating head or casing returns to its uppermost position after the awls have been forced into the work. These nails then drop down through the flexible tubes 268 and rest upon a retaining plate 284 having a sliding connection with the plate 272. The plate 284 is provided with nail delivering openings which may be brought into register with the short tubes 271 so as to permit the nails to drop into the openings in the nail loader 162. The plate is, however, normally held in such position that its openings are out of register with the tubes 271 by means of a spring 285 connected at its forward end to a stud upon the plate 284 and at its rearward end to a stud on the plate 272. As the nail loader carrier comes forward into nail receiving position, its upwardly projecting rear end strikes the rear end of the plate 284 and moves the plate into such position that its openings will come into register simultaneously with the openings in the tubes 271 and the openings in the loader 162, thereby permitting the nails to drop into the nail loader.

The raceways are supplied with nails by segmental lifting plates 286, one for each raceway, which oscillate in a nail pot or holder 288, alining guides 287 being provided at the upper end of the path of travel of each plate. The plates 286 pass through openings in the bottom 290 of the nail pot and are carried upon arms 292 loosely mounted upon the rock-shaft 294. Rigidly attached to the rock-shaft is an arm 296 to which is adjustably connected a rod 298, the arm 296 being provided with a slot whereby the connection between the rod 298 and the arm may be moved toward or away from the rock-shaft 294. The rod 298 receives at its lower end a crank pin upon a disk 304 upon a short shaft 306. The shaft 306 is driven by a worm and gear connection to a short shaft 307 which is itself connected by bevel gears 308, 309 to a third short shaft 310. A belt pulley 311 upon the shaft 310 may be connected to the source of power so that the nail supplying mechanism may be constantly operated.

The connections between the shaft 294 and the lifting plates 286 comprise an arm 312 rigidly attached to the shaft 294, the arm 312 having in its end a spring-pressed catch 316 which normally enters a notch 318 in a plate 320 on the arm 292. The notch 318 has inclined walls and the catch 316 has inclined sides, the inclination being such that if the lifting plate 286 in its upward movement meets an obstacle, such as a misplaced nail, the catch 316 will slip out of the notch 318 and permit the plate to drop back to its lowermost position. The dropping of the lifting plates 286 in the manner just described tends to stir up the nails in the nail pot. Each lifting plate is provided in its upper edge with a raceway section which forms a continuation of one of the raceways 270 when the lifting plate is in its uppermost position. The raceways 270 are thus constantly kept supplied with nails for the action of the separator blades 274.

As hereinabove stated, mechanism is preferably provided for trimming the heel-seat of the boot or shoe to be operated upon while the heel-seat is in position to be nailed. As already pointed out, the under side of the nail block 100 beneath each of the sets of nail receiving openings is shaped to fit the usual convex heel-seat end of the shoe. The heel-seat is therefore "laid" upon the shoe in advance of the nailing operation, being pressed up against the under side of the nail block, or against the pad of soft material which is preferably provided on the under side of the nail block, by work support operating mechanism hereinafter to be described. While the shoe and heel-seat are thus clamped in sole laying and nail receiving position the heel-seat is preferably trimmed by mechanism now to be described.

The illustrated trimming mechanism comprises a flexible knife 330 shaped to fit about the counter portion of the upper. This knife is carried by a knife carrier 332 provided with ears 334 which slide upon inclined guide rods 336 carried by brackets 338 bolted to the front of the standard 10. The knife is adapted to fit itself automatically to shoes of varying sizes and shapes and to this end it is supported at the rear by a plunger 340 which enters a socket 342 in the carrier 332, the plunger being limited in its forward movement by a bolt 344 carrying a nut 346 which abuts against the rear end of the socket 342. Surrounding the bolt 344 and confined between the bottom of the socket 342 and the bottom of a socket in the plunger 340 is a spring 348 which presses the plunger normally toward the forward limit of its movement.

Figure 15:
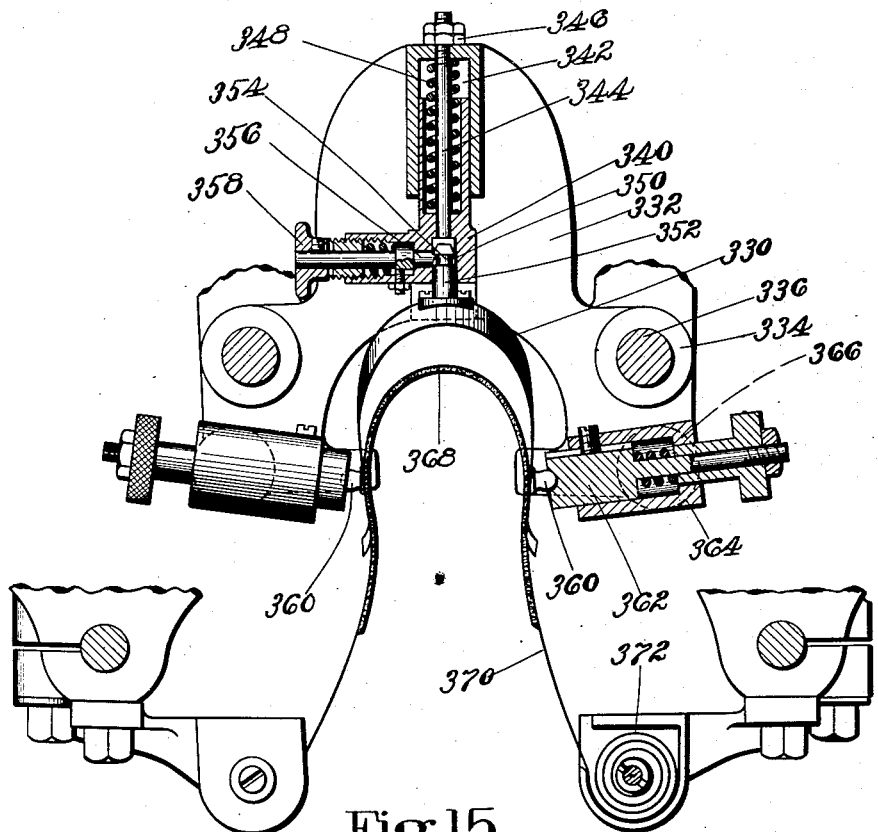
Fig. 15 (Sheet 7) is a plan view showing the heel-seat trimming mechanism.

For convenience in removing the knife for grinding or for replacement by another knife, the plunger 340 is provided with a socket 350 into which a stem 352 attached to the rear end of the knife is adapted to be inserted, this stem being provided with an annular groove 354 into which a spring-pressed catch 356 is adapted to enter to hold the stem in the socket. The catch may be withdrawn from locking position by means of a handle 358. Ball-ended studs 360 upon the sides of the knife are adapted to enter sockets in the outer ends of adjustable spring-pressed plungers 362 guided in sockets 364 pivoted at 366 upon the carrier 332 to swing about vertical axes. The plunger 340 is preferably so adjusted that when the knife is in inoperative position the plungers 362 will be substantially in the position shown in Fig. 15. When a shoe is inserted within the knife and the knife is pressed back against the action of the spring 348, the plungers 362 will be turned about their axes 366 in such manner that they will tend to press the sides of the knife against the sides of the upper and thus fit the knife closely to the outline of the shoe.

To protect the upper from being marred by the knife, a U-shaped piece of protecting material 368 is preferably provided which is carried by a metallic strip 370 coiled at its ends to form spiral springs 372 which, as they uncoil, permit the protector to move back into the knife 330 as the shoe is brought into operative position beneath the nail block 100. It will be noted that the guide rods 336 are inclined so that as the knife carrier 332 moves up during the trimming operation the knife will travel at an inclination to the surface of the sole to be trimmed, thus trimming the sole approximately to the slant of the heel which is to be attached to the shoe.

Figure 2:
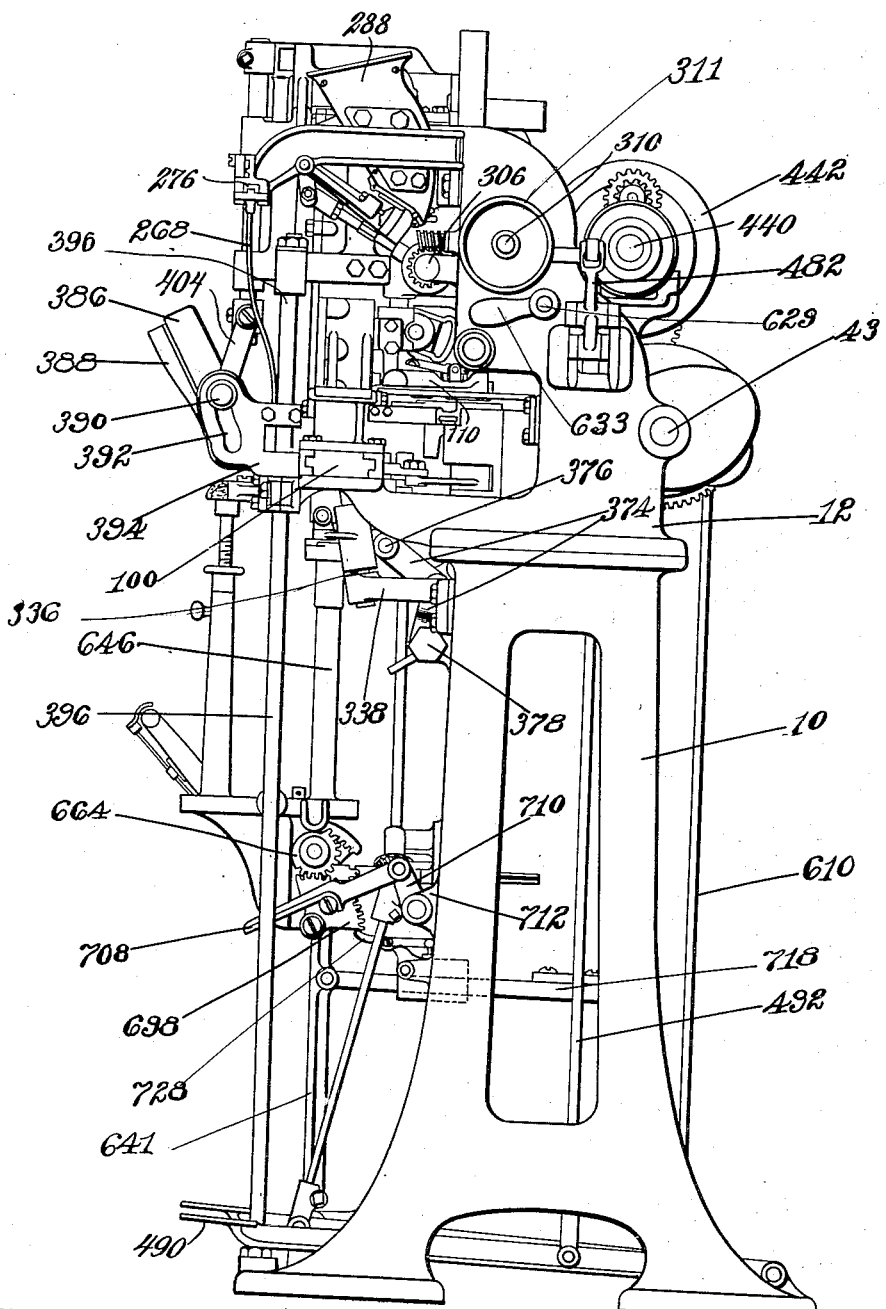
Fig. 2 is a side elevation of the machine as seen by an observer at the right of the machine.
Figure 3:
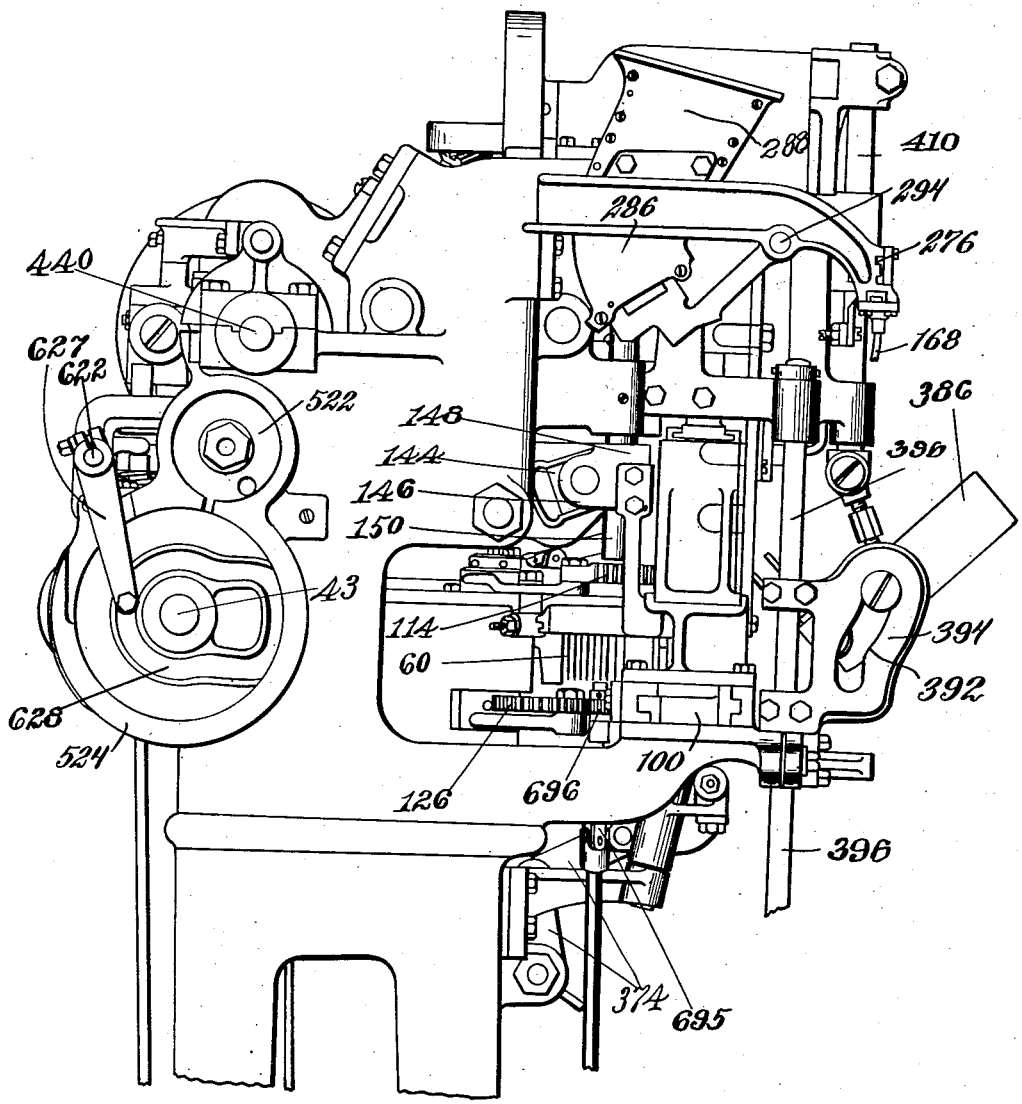
Fig. 3 is an elevation of the side opposite to that shown in Fig. 2, Fig. 3 being drawn to a larger scale and showing only the upper part of the machine.
Figure 4:
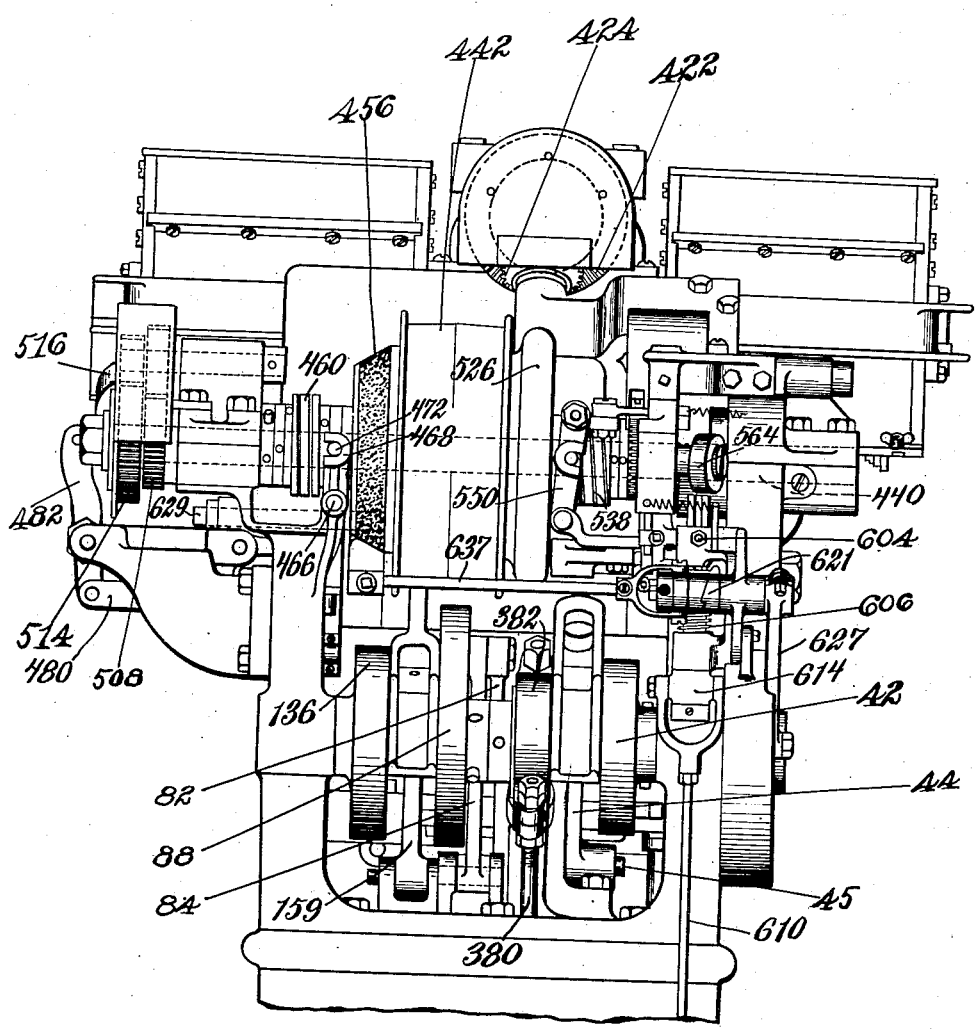
Fig. 4 is a rear elevation of the upper part of the machine.

The means for moving the carrier 332 to effect the trimming operation comprises a toggle 374, see Fig. 2, having one link pivotally connected at 376 to the carrier 332 and the other link pivotally connected at 378 to the standard 10. An adjustable rod 380 is pivotally connected at one end to the knee joint of the toggle 374 and at its other end is provided with an eccentric strap 382 which surrounds an eccentric 384 upon the shaft 43.

As hereinabove suggested, the heel end of the sole is laid as the work is pressed into position to receive the heel-seat nails. Means may also be provided for laying the forepart of the sole, and in the illustrated embodiment of the invention a suitable means for this purpose is shown. The illustrated means comprises a carrier 386 for a sole pressing pad 388, this carrier being provided with trunnions 390 received in slots 392 in brackets 394 clamped upon vertical rods 396 extending from the head of the machine to the base. The rods 396 have other functions besides supporting these brackets, among which is that of strengthening and stiffening the frame of the machine so that it will resist the strains which come upon it during the nailing and sole laying operations. The frame-stiffening mechanism disclosed herein is not claimed in this application but is disclosed and claimed in applicant's copending divisional application Serial No. 114,995, filed August 15, 1916.

Figure 9:
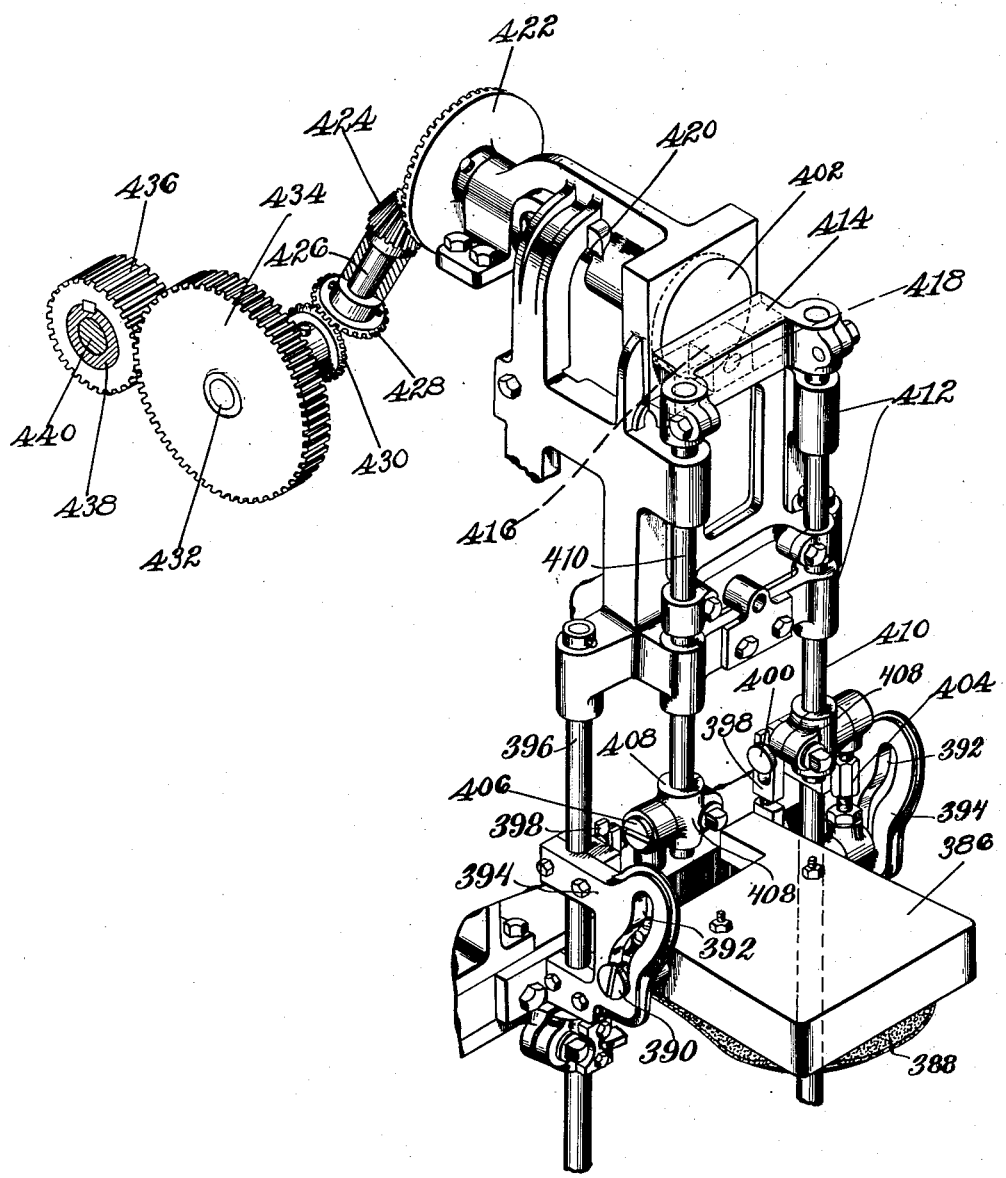
Fig. 9 is a detail perspective showing the sole laying mechanism and the means for operating it.
Figure 10:
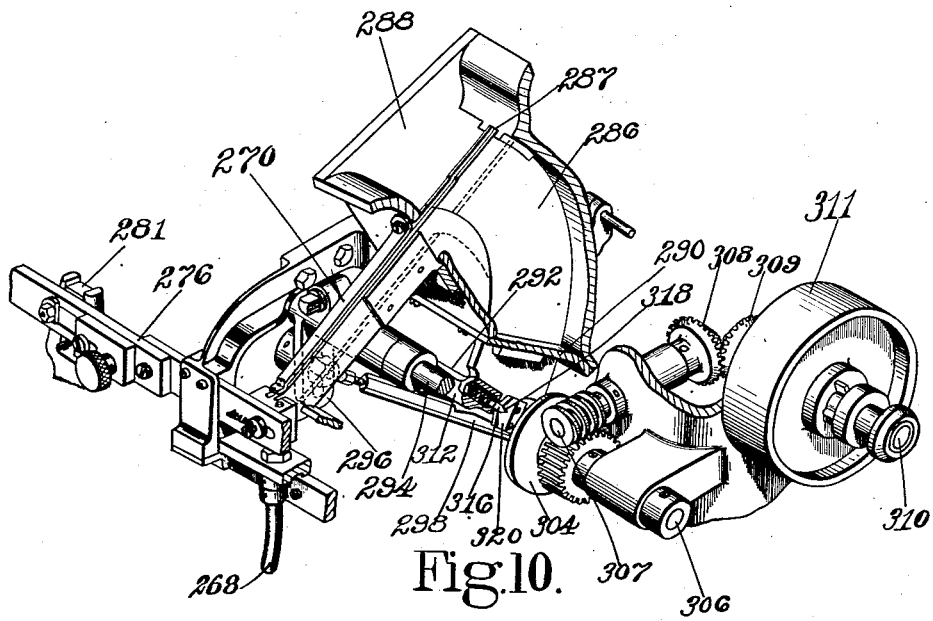
Fig. 10 is a detail perspective, partly in section, illustrating the nail supplying and nail separating means.
Figure 11:
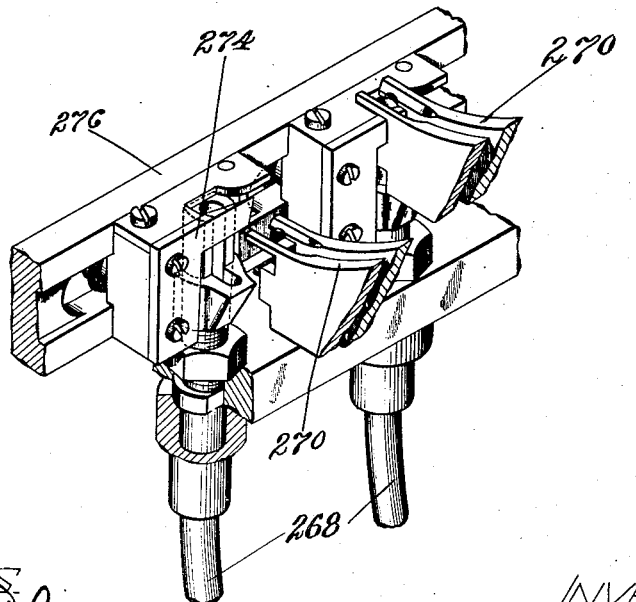
Fig. 11 is an enlarged detail perspective, partly in section, showing the construction of the raceway ends and the nail separators.

Attached to the sides of the pad holder 386 at its rear are adjustable slotted arms 398 which receive within their slots headed studs 400 upon the brackets 394. These arms 398 and the slots 392 in the brackets 394 serve to guide the pad holder during its downward movement and to cause it to turn from the position shown in Fig. 2 to the position shown in Fig. 9. The movements of the pad holder 386 are controlled by connections with a crank disk 402 comprising adjustable links 404 pivoted at their lower ends upon the trunnions 390 and at their upper ends receiving pivot screws 406 threaded into sleeves 408 clamped upon rods 410 arranged to slide vertically in guides 412 upon the front of the machine frame. The rods 410 are connected at their upper ends to a cross-head 414 provided with a horizontal slot which receives a sliding block 416 upon the crank pin 418 of the crank disk 402.

The crank disk 402 is carried on the front end of a horizontal shaft 420 which carries at its rear end a bevel gear 422. The shaft 420 receives its motion from a bevel pinion 424 upon an oblique shaft 426 which is connected by bevel gears 428, 430, to a horizontal shaft 432 extending at right angles to the shaft 420. A gear wheel 434 upon the horizontal shaft 432 is driven by a pinion 436 attached to a sleeve 438 upon the driving shaft 440. The sleeve 438 may be clutched to the loose driving pulley 442 by suitable clutch mechanism hereinafter to be described. The gearing between the pulley 442 and the crank disk 402 is such that it takes two rotations of the pulley 442 to move the sole laying pad holder 386 into its operative sole laying position and two more rotations of the pulley 442 to restore it to its inoperative position.

The forepart sole laying mechanism is arranged to be operated either independently or after an operation of the nailing mechanism. To this end independent means are provided for clutching the nailing mechanism and the forepart sole laying mechanism to the driving pulley 442. The means for connecting the nailing mechanism to the driving pulley 442 comprises a cone clutch member 444 carried by a sleeve 446 arranged to slide longitudinally of the shaft 440 and relatively to a spider 448 rigidly connected with the shaft 440 and adapted to engage projections 450 on the inside of the clutch member. The conical clutching portion 452 of the clutch member 444 is preferably formed of some good friction material, such as cork, and is adapted to engage a conical surface 454 upon the inside of the pulley 442. The clutch member 444 is preferably provided also with a conical surface 456 formed of similar friction material adapted to engage corresponding surfaces upon a brake member 458 when the clutch is in its released position.

The clutch member 444 is normally held in clutching position by a spring 460 which surrounds the shaft and bears at one end against a shoulder formed upon a ring 461 threaded upon the sleeve 446 and at its other end against a shoulder formed upon a second ring threaded upon another sleeve 462 rigidly attached to the shaft 440. The clutch member 444 is held out of its clutching relation to the pulley 442 by means of a lever 464 fulcrumed at 466 upon the machine frame and forked at its upper end. Each of the fork members 468 of the lever 464 is provided with a slot 470 which receives a trunnion 472 upon a ring 474 arranged to turn upon the sleeve 446.

The lever 464 is provided with a laterally extending lug 476 which is normally engaged by a lug 478 upon a link 480 pivotally connected to the lower end of a lever 482 fulcrumed at 484 upon the machine frame. When the parts are in the position shown in Fig. 12 the link 480 causes the lever 464 to hold the clutch member 444 out of clutching relation to the pulley 442. The link 480 is normally held in such position that the lug 478 will remain in engagement with the lug 476 by means of a spring-pressed plunger 486 which is normally maintained at the uppermost limit of its movement by a spring 488. The link 480 may be moved out of its operative clutch releasing relation to the lever 464 by connections with a treadle 490 in the base of the machine. These connections comprise a rod 492 pivotally connected at its lower end to the treadle 490 and having pivoted to its enlarged upper end 494 a hook member or latch member 496, the hook portion 498 of which is adapted to engage a catch plate 500 attached to the side of the link 480 or formed integral with said link. This catch plate 500 extends slightly beyond the end of the link 480 and overlaps the lever 464 whereby it serves to guide the relative movements of the link 480 and the lever 464. As the treadle is depressed, the hook 498 engages the catch plate 500 and moves the lug 478 out of engagement with the lug 476, thereby permitting the lever 464 to turn about its pivot 466, whereby the spring 460 is permitted to move the clutch member 444 into clutching relation to the pulley 442. As the lever 464 turns about its pivot 466 an adjustable stud 502 in the lower end of the lever 464 engages the boss 503 upon the latch member 496 and turns said latch member about its pivotal connection with the enlargement 494 of the rod 492 until the hook 498 is moved out of engagement with the catch plate 500, thereby permitting the link 480 to be restored to its normal position by the action of the spring-pressed plunger 486.

In order that the lug 478 may again come behind the lug 476 it is necessary that the link 480 be moved longitudinally toward one side of the machine. This movement of the link 480 is effected by means of a spring 504 but is only permitted when the shaft 440 has turned through a certain angle of rotation.

The means for determining the time of the clutch releasing movement of the lever 464 comprises a cam disk 506 mounted to turn freely upon the end of the shaft 440 and driven from said shaft through a train of gears 508, 510, 512 and 514, so that said cam disk makes one rotation for two rotations of the shaft 440. The cam disk 506 is provided with a face cam 516 against which bears a cam roll 518 upon the lever 482. When the low part of the face cam 516 comes beneath the cam roll 518, the link 480 is moved rearwardly by the spring 504 and thus the lug 478 is permitted to come behind the lug 476 so that when the high part of the cam 516 comes beneath the cam roll 518 the link 480 will turn the lever 464 about its pivot 466 in a direction to move the clutch member 444 out of clutching relation to the pulley 442.

When the shaft 440 is turned over by hand, unless provision is made for preventing the movement of the clutch member 444 into engagement with the pulley 442 such movement will take place as the cam 516 turns until its low point comes beneath the cam roll 518. To prevent this clutching movement and thus permit the shaft to be turned over easily when the brake is removed by means hereinafter described, a stop 519 is arranged in the path of an adjustable stop 523 upon the lever 464, the stop 519 comprising a link pivoted at 525 upon the machine frame and held normally in the path of the stop 523 by a spring 527. When the rod 492 is drawn down to effect the clutching of the clutch member 444 to the pulley 442 the stop 519 is drawn out of the path of the stop 523 by connections with the latch member 496 comprising a link 529.

The shaft 440 is connected to the shaft 43 by a train of gears comprising a gear 520, rigidly connected to the shaft 440, an idler 522 and a third gear 524, rigidly connected to the shaft 43. As already stated the forepart sole laying mechanism may be manually controlled, or it may be operated automatically after other operations upon the shoe have been completed. Preferably means is provided whereby the forepart sole laying mechanism may either be manually actuated so that it will be brought into operative sole laying position before the nailing operation begins and then will be automatically moved out of operative position after the nailing operation is completed, or it may be automatically brought into operative sole laying position after the nailing operation is completed and then may be manually actuated to bring it into inoperative position after the sole has been allowed to set to shape.

The means for connecting the gear 436 to the driving pulley 442 comprises a clutch member 526 carried by a sleeve 528 arranged to slide longitudinally of the shaft 440 upon the sleeve 438. The clutch member 526 has a conical clutching surface formed of suitable friction material 530 which is arranged to engage a coöperating conical surface 532 upon the inside of the pulley 442. A spider 534, rigidly connected to the sleeve 438, is adapted to engage projections 536 upon the inside of the clutch member 526. A spring 538, confined between a ring 540 threaded upon the sleeve 528, and a second ring, threaded upon a sleeved extension of the gear 436, tends to move the clutch member 526 normally into clutching relation to the pulley 442. The clutch member 526 is normally held out of clutching relation to the pulley 442 by connections with a cam 542 mounted to turn freely upon the sleeve 438 and geared to said sleeve to turn once for two rotations of said sleeve and therefore two rotations of the pulley 442 by a train of gears 544, 546, 548, the gear 548 meshing with the gear 436.

The clutch operating connections to the cam 542 comprise a lever 550, of the second class, fulcrumed at 552 upon the machine frame, this lever being forked and being provided in each of its fork members with a slot 554 which receives one of the trunnions 556 upon a ring 558 confined between the threaded ring 540 and a shoulder of the sleeve 528, the ring 558 being adapted to turn freely upon the sleeve 528. A two-part bell-crank lever arranged to turn about a vertical stud or shaft 560 carries upon one arm 562 a cam roll 564 which bears against the cam 542. The other arm 566 of the two-part bell-crank lever is connected by a link 568 having vertical pivots with a second link 570, turning about a horizontal pivot upon the upper end of the lever 550. When the two parts 572 and 574 of the bell-crank lever are connected together, as shown in Fig. 13, the engagement of the high part of the cam 542 with the cam roll 564 causes the clutch member 526 to be moved out of clutching relation to the pulley 442. The connection between the two parts 572 and 574 of the two-part bell crank is so constructed and arranged that these parts may be disconnected so that the spring 538 may be permitted to move the clutch member 526 into clutching relation to the pulley 442 while the cam roll 564 is still in engagement with the high part of the cam 542.

The illustrated connection between the two parts 572 and 574 of the two-part bell crank comprises a pin 576 carried by the lower part 574 of the two-part bell crank, this pin being arranged to slide through an opening in the bottom 578 of a socket in the part 574 and being normally held in its highest position by the spring 580 confined between the bottom of the said socket and a collar 582 upon said pin, whereby the projecting upper end of the pin is normally maintained in a hole 584 in the upper part 572 of the two-part bell crank.

Clamped to the end of the pin 576 which projects below the bottom 578 of the socket in the member 574 is a sleeve 586 provided with a lug 588 over which a hook 590 pivoted at 591 upon a bracket 592 clamped upon a rod 593 is normally hooked, the hook 590 being drawn toward its operative relation to the lug 588 by a spring 594 and being limited in its movement in this direction by a lug 595 upon the bracket 592, whereby a rounded portion 596 upon the upper end of said hook is brought into such relation to the path of travel of the hook with the rod 593 that as said hook engages the lug 588 on the return movement of the rod 593 it will slip over the said lug 588. It will be noted that the movement of the bell-crank is in such a direction that it moves the lug 588 out of engagement with the hook 590 when the clutch member 526 is moved into clutching relation to the pulley 442.

The rod 593 is arranged to move vertically in guides 598, 600 and is provided with a vertical groove 602 into which extends a screw 604 to keep the rod from turning about its longitudinal axis. A spring 606 confined between the lower guide 600 and the bracket 592 tends to keep the rod 593 in its uppermost position. The rod 593 may be depressed to move the bracket 592 downward by means of connections with a treadle 608 in the base of the machine, these connections comprising a rod 610 pivotally connected to the treadle between its ends and having at its upper end a yoke 612 which receives trunnions carried by a sleeve 614 confined upon the rod 593 by a collar 616. Depression of the rod 610 causes the sleeve 614 to pull down on the collar 616, thereby depressing the rod 593 against the spring 606. As the rod 593 is depressed it carries down the bracket 592 and the hook 590 bearing upon the lug 588 pulls the pin 576 out of the hole 584 in the part 572 of the two-part bell crank, thereby permitting the spring 538 to move the clutch member 526 into engagement with the pulley 442. As the sleeve 438 begins to turn with the pulley 442, the cam 542 will rotate so that the cam roll 564 will bear upon the lower part of the cam, that is, the part nearer the shaft 440, thereby permitting the part 574 of the bell crank to be swung back by the spring 618 into position to bring the pin 576 again beneath the hole 584 in the part 572.

The means for actuating the sole laying mechanism automatically comprises an arm 620 carried upon a hub 621 loosely mounted upon a horizontal rock-shaft 622, the hub 621 being provided with a tooth 623 adapted to be engaged by a tooth 624 upon a sleeve 625 keyed upon the shaft 622 whereby it may slide longitudinally upon said shaft to bring its tooth 624 into and out of engagement with the tooth 623 upon the hub 621. The arm 620 is arranged to engage a ledge 626 formed upon the bracket 592. The rock-shaft 622 is rocked to cause the arm 620 to depress the bracket 592 and with it the hook 590 by connections with the gear wheel 524 comprising an arm 627 clamped upon the shaft 622 and having at its outer end a cam roll which enters a cam groove 628 in the gear wheel 524.

In order that the nailing mechanism may be easily turned over by hand without actuating the sole laying mechanism, means is provided for interrupting the actuating connections between the nailing mechanism and the sole laying mechanism, this means serving also to remove the brake 458 from the brake surface 456 upon the clutch member 444. The illustrated means comprises a rod 629 connected to the brake member 458 and upon which is confined, between a collar 630 and a cam face 632 formed upon the bearing in the frame for said rod, a cam sleeve 631 provided with a handle 633 which as it is turned upon said rod 629 either moves said rod longitudinally to remove the brake 458 from the brake surface 456 upon the clutch surface 444 or permits said brake to be moved back into its operative braking position by a spring 634, bearing at one end against said brake and at its other end against the bottom of a socket 635 in the machine frame. Clamped upon the brake 458 is an arm 636 which is connected by a rod 637 to a yoke 638 receiving trunnions upon a ring 639 confined by a collar 640 upon the sleeve 625. When the cam sleeve 631 is turned in a direction to move the brake 458 out of engagement with the brake surface 456, the rod 637 will be moved in a direction to cause the tooth 624 on the sleeve 625 to be moved out of engagement with the tooth 623 on the hub 621 whereby when the rock-shaft 622 is turned the arm 620 will not be turned with said rock-shaft and the sole laying mechanism will not be clutched to the pulley 442.

Any suitable work support may be used with this machine. In most instances, however, a work support of the type known as "jacks" will be required since the heel-seat is preferably nailed while the shoe is upon an iron bottom last which acts to clench the nails upon the inside of the shoe. The illustrated jack is of the type which comprises a last pin and a saddle, the saddle being provided to support the forepart of the shoe during the sole laying operation.

Figure 19:
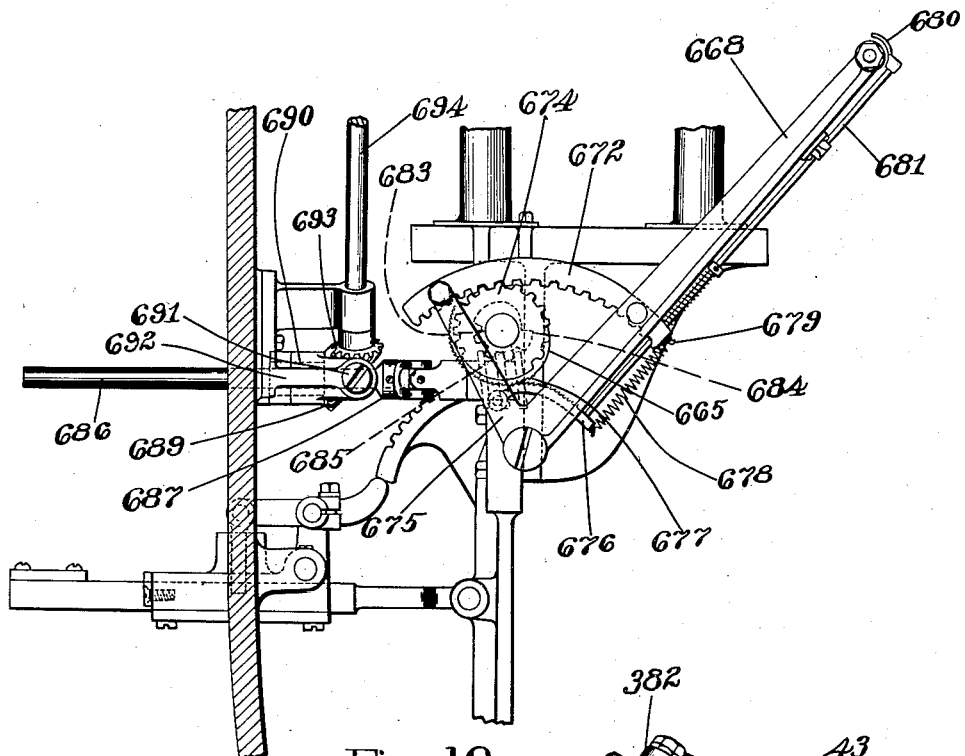
Fig. 19 is a detail elevation of the other side of the jack construction shown in Fig. 17.
Figure 16:
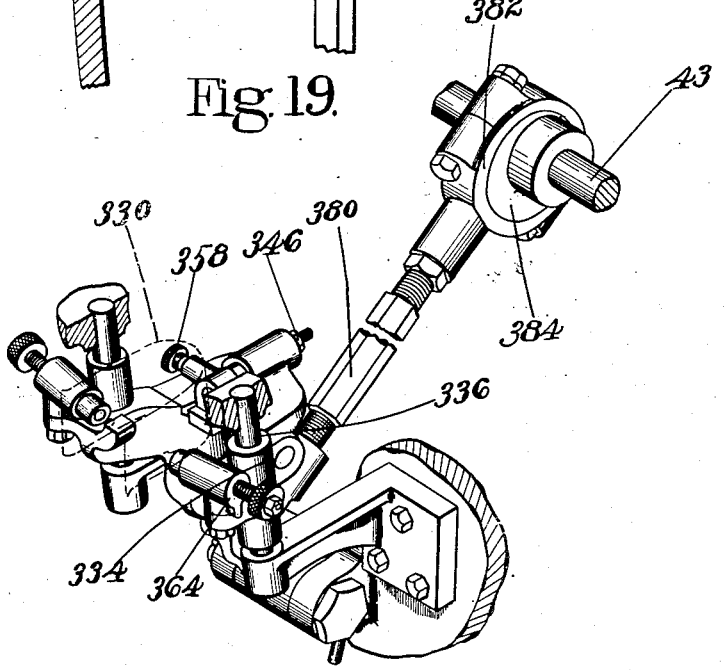
Fig. 16 (Sheet 12) is a perspective detail showing the means for operating the heel trimming mechanism.

Various forms of jacks may be used with this machine, but the preferred form of jack is one in which the last is supported both at the toe and the heel ends, that is, a jack of the last pin and saddle type, and one which can be easily and quickly adjusted to adapt it for use with lasts of various dimensions. One form of jack is shown in detail in Figs. 17, 18 and 19 and comprises a post 641 which is pivoted at 642 to the base of the machine and swung about a horizontal axis toward and away from the front of the machine. The post 641 carries at its upper end a table 644 upon which are mounted the carriers 646 and 648 respectively for a last pin 650 and a saddle 652. The carriers 646 and 648 are provided with dove-tailed faces 654 and 656 which slide in a horizontal dove-tailed guide in the upper face of the table 644. The table itself has a supporting bracket 658 which is provided with a vertical dove-tail 660 sliding in a dove-tailed guide in the face of an enlarged part 662 of the post 641. The sliding connection between the bracket 658 and the head 662 of the post 641 provides for the vertical adjustment of the table 644 and therefore of the last pin and saddle, and the table is supported in its different positions of vertical adjustment and is also lifted by eccentrics 664 and 665, one upon each side of the head 662, these eccentrics being carried upon a rock-shaft 666 which may be turned to effect the rotation of the eccentrics either by connections to a hand lever 668 or by connections to a treadle 670. The operative connections by which the turning of the shaft 666 may be effected by the hand lever 668 comprise a segment rack 672 carried by said hand lever 668, said rack engaging teeth upon a pinion 674 attached to said rock-shaft 666.

The lifting of the table 644 through the connections described is for the purpose of moving the heel-seat up against the under side of the nail block 100. In order to maintain the heel-seat clamped in this position, the hand lever 668 has pivoted upon its arm 675 a many-toother pawl 676 which is adapted to engage teeth of a ratchet 677 formed on a portion of the periphery of the eccentric 665. A spring 678 connected at one end to the end of said pawl remote from its pivot and at its other end to a hook 679 upon the lever tends to maintain said pawl normally in engagement with the ratchet. The pawl may be released by pressure upon a hand piece 680 connected to the upper end of a rod 681 which is connected at its lower end to said pawl, said hand piece 680 lying above a handle 682 which the operator grasps to move the hand lever 668.

Inasmuch as the heights of lasts vary with variations in size, the table 644 is preferably adjusted into different elevations for the different size ranges. To relieve the operator of the necessity of looking after this adjustment every time he changes the adjustment of the machine for the different size ranges, the adjustment of the work support into its different work receiving elevations is preferably effected automatically through connections with the lever 110 by which the movements of the gangs of awls, the gangs of drivers and the nail block are effected. The means for effecting the aforementioned adjustments of the work support comprise a worm gear 683 which has a tooth 684 located in a notch in the rear face of the bracket 658 whereby when said gear is rotated in a counter-clockwise direction in Fig. 19, the bracket 658, with the table 644 and the last pin 650 and saddle 652, will be elevated. The worm 685 in the bearing in the head 662 engages the worm gear 683 and is operated to effect the work support adjusting movements of the worm gear by connections with the segment rack 126 comprising a shaft 686 having a universal joint connection 687 with the worm 685. The shaft 686 is provided with a groove 688 which receives a key carried by a bevel gear 689 through which the shaft 686 is arranged to slide as the post 640 swings about its pivot 642 toward and away from the machine.

The gear 689 has bearings in a yoke 690 adapted to swing slightly to compensate for the tipping of the shaft 686, said yoke being carried upon trunnions 691 having bearings in the two arms of a bracket 692 upon the machine frame. The bevel gear 689 meshes with a second bevel gear 693 upon an inclined shaft 694 which has a universal joint connection 695 with a short vertical shaft which carries upon its upper end a pinion 696 meshing with the segment rack 126. As soon therefore as the segment rack is turned to effect the adjustment of the nail block 100, a corresponding vertical adjustment is effected.

As above suggested, in addition to the means described by which the jack can be moved between work receiving and work clamping position by hand means is also provided by which this movement may be effected by the foot of the operator or by which the hand movement may be aided by the foot. The connections to the treadle 670 by which the movement of the jack may be effected by the foot comprise a segment rack 698 pivoted at 700 upon the post 641, said rack meshing with gear teeth 702 formed upon the eccentric 664 and being provided with a stud 704 adapted to be engaged by the shoulder 706 of a thrust link 708 forming one member of a toggle, the other member 710 of which is pivoted in the bracket 712 on the frame of the machine. A link 714 connected at one end to the treadle 670 and at its other end to the knee joint 716 of the toggle acts when the treadle is depressed to straighten the toggle and to force the shoulder 706 and the thrust link 708 against the stud 704 of the segment rack 698 and thus turn the eccentric 664 in a clockwise direction to raise the jack. As hereinabove pointed out, the jack may be swung bodily toward and away from the machine. When the jack is in operative position, the post 641 is substantially vertical and is maintained in its vertical position by a locking device hereinafter described. This locking device comprises a slide 718 operatively connected at 720 to the post 641, said slide being arranged to slide through a guide 722 in the standard 10 and being prevented from being withdrawn from said guide by a stop 724. Pivoted upon the bracket 726 at the front end of the guide 722 is a lever 728 which carries at its rear end a locking pin 730 adapted to gravitate into a socket in the slide 718 when the post 641 is in its vertical position. The front end of the lever 728 extends into the path of the segment rack 698 so that when the segment rack moves in the direction to lower the jack it strikes the lever and withdraws the pin 730 out of the socket in the slide 718, thus releasing the jack so that it may be swung to its inoperative position away from the machine, this movement, as above pointed out, being limited by the stop 724.

The last pin 650 is mounted upon a holder 647 which is pivoted at 649 to the top 651 of the carrier 646 whereby a limited lateral movement of the last pin is permitted to provide for the automatic centering of the last for the heel-seat trimming and nailing operations. The amount of lateral movement is limited by a shoulder 653 upon the top 651 which is engaged by a corresponding shoulder upon the holder 647. The saddle carrier 648 in which the saddle 652 is vertically adjustable in any suitable manner is mounted upon a slide 656, as hereinabove described, and this slide for purposes of adjustment is provided with a rack 732 with which meshes a pinion 734 provided with a hand wheel 736 by which it may be turned to adjust the saddle toward and away from the last pin 650.

Figure 20:
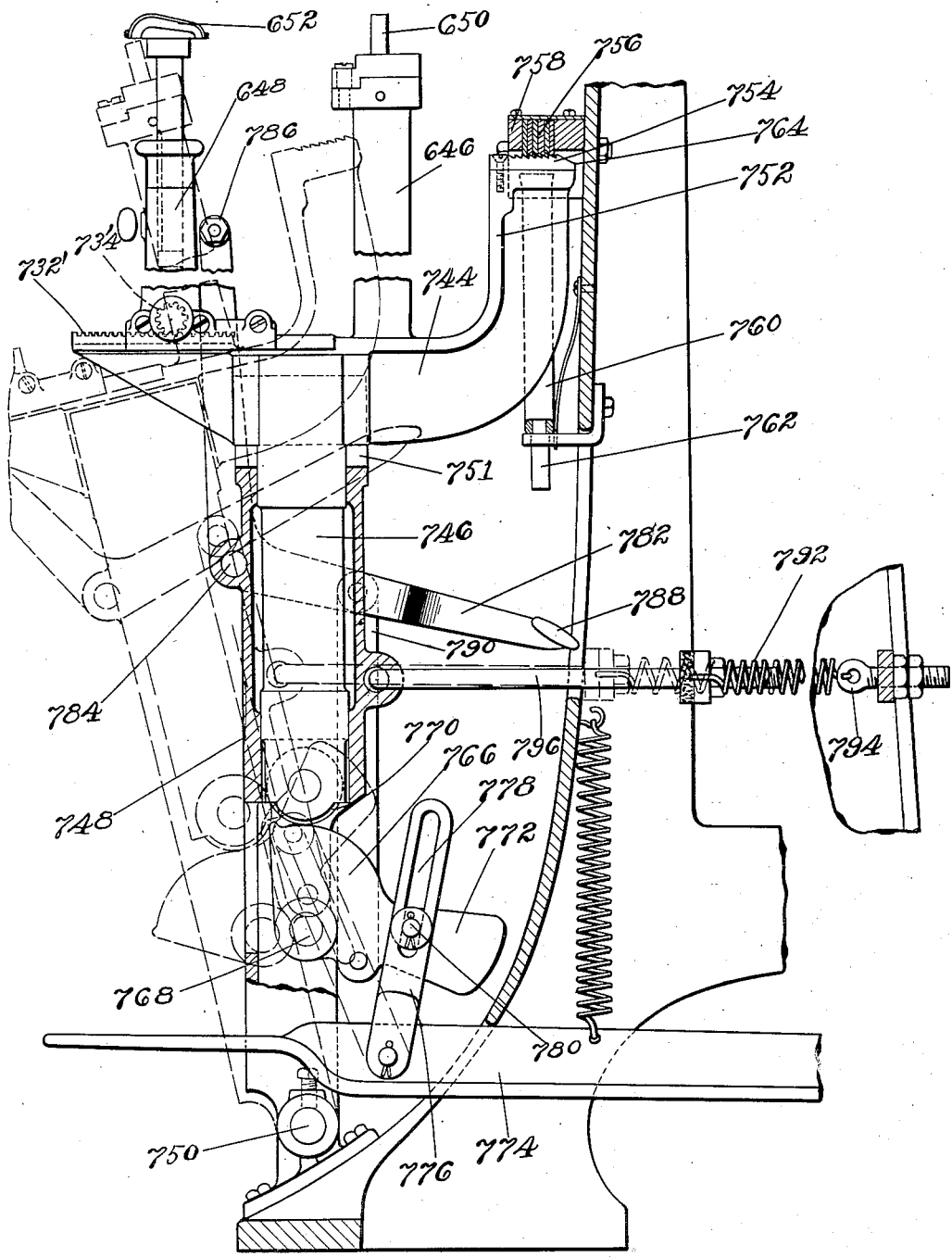
Fig. 20 is a side elevation of the modified jack construction.

In Fig. 20 is shown a modified jack construction having the same last pin 650, saddle 652, last pin carrier 646 and saddle carrier 648 and substantially the same adjusting mechanism for the saddle carrier comprising a rack 732' and pinion 734'. The table 744 upon which these parts are mounted is of a different shape from the table of the jack hereinabove described and is carried upon the upper end of a vertical sliding shaft 746 guided within a hollow jack post 748 which is fulcrumed at 750 to swing toward and away from the machine. Guideways 751 in the upper end of the post 748 prevent the table 744 from turning relatively to the post. At its rear end the table 744 is provided with an upward extension 752 to which is attached a toothed plate 754 adapted to be engaged by a plurality of pawl teeth formed upon the lower edges of plates 756 clamped in a holder 758 extending between the two arms 760 of a yoke carried upon the upper end of a sliding bolt 762. The pawl teeth upon the plates 756 gravitate with said plates into engagement with the ratchet teeth upon the plate 754. It will be noted that the rear end of the plate 754 is beveled at 764 so that as the jack is pushed toward the machine the plate 754 will slide under the toothed plates 756 and raise the yoke, thus causing the jack to be automatically locked in its vertical work supporting position.

In order to bring the heel-seat to be nailed up against the under side of the nail block 100, means is provided for elevating the shaft 746 when the jack post 748 is in vertical position. The illustrated means comprises a cam 766 pivoted at 768 in the jack post 748, said cam engaging a roll 770 pivoted in the lower end of the shaft 746 and having an arm 772 extending through a slot in the jack post 748 by which arm the movements of the cam are controlled. To raise the horn shaft 746 into work clamping position, the cam 766 is turned in a clockwise direction in Fig. 20 and the illustrated means for effecting this turning is manually operated. The turning is preferably effected by connections with a treadle lever 774 comprising a link 776 having a slot 778 which receives a pin 780 upon the cam extension or arm 772. The slot 778 is suitably elongated for lost motion whereby the swinging of the jack into and out of operative position beneath the nail block does not affect the position of the treadle. The slot is also of such length and so related to the movements of the treadle that when the treadle is permitted to rise to its uppermost position after being depressed to turn the cam into its operative position, the cam will not be returned to its inoperative position.

To effect the unlocking of the jack so that it may be swung away from the machine and at the same time to lower the work, means is provided whereby the pawl teeth may be raised out of engagement with the ratchet teeth upon the plate 754 and whereby at substantially the same time the table 744 may be lowered with the shaft 746. The illustrated means comprises a bell-crank lever 782 fulcrumed at 784 upon the jack post 748, said lever having upon one arm a handle 786 in convenient position to be grasped by the operator and having upon the rear end of its other arm a face 788 so located with respect to the sliding bolt 762 that as said lever is turned to raise this end the face 788 will engage the bolt 762 and raise the pawl teeth out of engagement with the ratchet teeth on the plate 754. At the same time a link 790 connected at one end to this arm of the lever 782 and at its other end to the arm 772 of the cam 766 will turn said cam in a counter-clockwise direction, Fig. 20, and thus lower the shaft 746 and the table 744. The jack can thus be easily swung into position for the removal of the work. A spring 792 connected at one end to an eye-bolt 794 in the rear part of the standard of the machine frame and at its other end to a link 796 hooked into the jack post 748 aids the operator in moving the jack post into its operative position and resists too rapid movement of the jack post into its work receiving position.

The sole laying mechanism disclosed herein is not claimed in this application but is made the subject matter of a divisional application Serial No. 114,995, filed Aug. 15, 1916. Also the work support disclosed herein is not claimed in this application but is made the subject matter of a divisional application Serial No. 114,996, filed Aug. 15, 1916.

Having described my invention what I claim as new and desire to secure by Letters Patent of the United States is:—

1. A nailing machine having, in combination, awl operating means, a plurality of gangs of awls adjustable along a path which does not include the operating position, means for transferring any one of said gangs of awls from said path into operating position in said awl operating means, and nail loading means also operated by said transferring means.

2. A machine of the class described having, in combination, awl operating means and driver operating means guided within the awl operating means, means for moving different drivers into and out of operative position in said driver operating means, means moving at right angles to the direction of movement of said driver moving means for moving the awl into and out of operative position in its operating means, and a nail carrier connected to said awl moving means.

3. A machine of the class described having, in combination, fastening inserting means, an awl arranged to be moved from a point behind said inserting means into and out of operative position in the line of insertion, a fastening carrier arranged to be moved from a point in front of said inserting means into and out of operative position in the line of insertion, a single means for effecting the movements of said awl and said carrier, and means movable transversely to the direction of movement of said last mentioned means for carrying different awls into and out of operative position in said means.

4. A machine of the class described having, in combination, awl operating means, driver operating means guided within the awl operating means, awl transferring means for moving the awl into and out of position in its operating means, means movable transversely to the direction of movement of said awl transferring means for carrying different awls into and out of operative position in said transferring means, means for carrying different drivers into and out of operative position in said driver operating means, a nail carrier connected to said awl transferring means and movable into position in the line of drive in alternation with said awl, and means operated by said awl operating means for supplying a nail to said nail carrier.

5. A machine of the class described having, in combination, fastening inserting mechanism, a plurality of raceways located upon each side of said inserting mechanism, nail tubes leading from said raceways to a nail delivering means in front of said inserting mechanism, awls located behind said inserting mechanism, means for moving said awls into and out of position in the line of insertion, and means connected to said awl moving means to carry fastenings from the delivering means into position to be driven.

6. In a nailing machine a plurality of sets of nail guides movable in turn into operative nail guiding position, nail loading mechanism operating to deliver nails to the set of guides in operative position, said mechanism being adapted to receive interchangeably nail loaders corresponding to the sets of nail guides, and means for preventing the insertion in said mechanism of a nail loader which does not correspond to the set of nail guides in operative nail guiding position.

7. In a machine of the class described, fastening inserting mechanism adjustable to different size ranges of shoes, fastening guides also adjustable to different size ranges of shoes, fastening delivering means comprising a carrier and a fastening holder movable into and out of delivering position over said fastening guides, a different fastening holder being provided for each adjustment of said guides, and means for preventing the use in said carrier of a fastening holder which does not correspond to the particular fastening guides in operative position.

8. In a nailing machine a plurality of sets of nail drivers, a plurality of sets of nail guides, means for effecting an adjustment into operative position of any one of said sets of drivers in its corresponding sets of guides, a nail loader carrier adapted to receive a nail loader corresponding to the set of nail guides in operative position, and means brought into operative position by the adjustment of said drivers and said guides for preventing the insertion in said carrier of a nail loader which does not correspond to the set of guides in operative position.

9. A nailing maching having, in combination, awl operating means, a plurality of gangs of awls adjustable along a path which does not include the operating position, means for transferring any one of said gangs of awls from said path into operating position in said awl operating means, a nail loader carrier connected to said transferring means, said carrier being adapted to carry interchangeably a nail loader of a size suited for use with the operative gang of awls, and means for preventing the insertion in said carrier of a loader which is not suited for use with the particular gang of awls in operative relation to said transferring means.

10. A machine of the class described having, in combination, fastening inserting means, a work support arranged to support the work against the thrust of the fastening inserting means, and means for effecting an adjustment of said fastening inserting means and, simultaneously, an adjustment of said work support to adapt the machine for work of different characteristics.

11. A machine of the class described having, in combination, fastening inserting means, a work abutment and a jack, and means for effecting an adjustment of said fastening inserting means to adapt it to boots or shoes of different sizes and, simultaneously, a corresponding adjustment of said jack with respect to said work abutment to adapt it to the lasts employed with the said different sizes of boots or shoes.

12. A nailing machine having, in combination, a plurality of gangs of drivers adapted for use with different size ranges of shoes, a work support and a work abutment, and means acting to bring a selected gang of drivers into operative position over said work support and simultaneously to adjust said work support with respect to said abutment for the size range for which the particular gang of drivers is adapted.

13. A machine of the class described having, in combination, awl operating means, driver operating means, a plurality of gangs of awls and a plurality of gangs of drivers movable in succession into operative relations to the respective operating means, a work abutment and a work support, and means for effecting by a single operation a selective adjustment of said gangs of awls and drivers and of said work support with respect to said work abutment.

14. A machine of the class described having, in combination, driver operating mechanism, means for moving different drivers into and out of operative relation to said driver operating mechanism, a work support, and connections between said means and said work support for simultaneously effecting an adjustment of said work support to adapt it for use with the respective drivers.

15. In a machine of the class described fastening inserting mechanism adjustable for different size ranges of shoes, a work support and a work abutment, means for effecting automatically an initial adjustment of said work support with respect to said abutment as the fastening inserting mechanism is adjusted to the different size ranges, and manually operated means for moving said work support into work clamping position.

16. In a machine of the class described, fastening inserting mechanism adjustable to different work sizes, a work support arranged to support the work against the thrust of the fastening inserting mechanism and adjustable to different work sizes, and means for simultaneously effecting said adjustments.

17. In a machine of the class described, fastening inserting mechanism adjustable to different work sizes, a work support movable between position to receive the work and position to support the work against the thrust of the fastening inserting mechanism and adjustable while in work receiving position to different work sizes, means for simultaneously effecting said adjustments, and means for effecting the movements of the work support.

18. In a machine of the class described, fastening inserting mechanism adjustable for different size ranges of shoes, a work support, a work abutment, means for effecting the adjustment of the fastening inserting mechanism, and means operated from said last mentioned means for effecting a corresponding adjustment of the work support with respect to the work abutment.

19. In a machine of the class described, fastening inserting mechanism adjustable for different size ranges of shoes, a work support arranged to support the work against the thrust of the fastening inserting mechanism and adjustable for different size ranges of shoes, and a single means for effecting simultaneously proportionate adjustments of said inserting mechanism and said work support.

20. A nailing machine, having, in combination, awl operating means and driver operating means guided within the awl operating means, a plurality of gangs of awls adjustable along a path lying outside the operating position, a plurality of gangs of drivers adjustable along a path including the operating position, means operating transversely to the path of adjustment of said drivers for moving any one of said gangs of awls from its path of adjustment into and out of operative position in the awl operating means, and nail loading means also operated by said last-mentioned means.

In testimony whereof I have signed my name to this specification in the presence of two subscribing witnesses.

PERLEY R. GLASS.

Witnesses:
H. DORSEY SPENCER,
HARLOW M. DAVIS.